PHOSPHOR SUSPENSION CONTAINING HYDROXYETHYL CELLULOSE

Robert W. Repsher, Bloomfield, N.J., and William A. Tarleton, and William E. Wilson, Fairmont, W. Va., assignors to Westinghouse Electric Corporation, Pittsburgh, Pa.
Filed Nov. 1, 1973, Ser. No. 411,887
Int. Cl. C08b 21/24, 27/04
U.S. Cl. 106—183            3 Claims

ABSTRACT OF THE DISCLOSURE

Method of preparing a suspension in a vehicle for use including discharge lamp envelopes, wherein an aqueous solution of hydroxyethyl cellulose is prepared, filtered and purified by using a cation ion exchange resin to remove the sodium ions of the sodium acetate impurity, but leave the acetate ions. Ammonium hydroxide is then added to raise the pH to at least of 6.5 and to react with the acetate ions to form ammonium acetate to inhibit mold growth. Preferably ammonium hydroxide is added to essentially neutralize the purified solution and a basic solution such as triethanolamine is then added to raise the pH of the solution to about 8.5–9.0, whereby bacteria growth is inhibited.

---

CROSS-REFERENCE TO RELATED APPLICATIONS

In copending application Ser. No. 170,018, filed Aug. 9, 1971, and assigned to the present assignee, there is described a coating composition and method, using hydroxy alkyl celluloses, in which cellulose solutions are purified by both anion and cation ion exchange. The instant invention provides a simplified mehod in that only cation ion exchange is used and in which the acetate ion remaining from the sodium acetate impurity is used in a reaction with ammonium hydroxide to form ammonium acetate.

BACKGROUND OF THE INVENTION

This invention relates to method for coating discharge lamp envelopes with inorganic particles (such as phosphors).

A number of vehicles have been used in suspending inorganic particles to be coated on lamps (i.e. phosphors for fluorescent lamps). Aqueous systems are desirable over systems using organic solvents because of the cost and dangers inherent with the use of organic solvents. As is noted in the above mentioned copending application, hydroxy alkyl celluloses are generally non-reactive and preferable to other commonly used water based vehicles such as polyacrylate acid. Hydroxyethyl cellulose has been found to have the proper flow of properties but, as commercially available contains undesirable impurities, in particular sodium acetate, and is subject to attacks both by bacteria and mold. In U.S. Pat. No. 3,055,767, dated Sept. 25, 1962 a method is taught whereby the impurities are removed by methyl alcohol washes. Such a procedure is relatively costly, involves the use of flammable solvents, requires batch processing of material, and involves an initial processing step. In addition the problems of attack of hydroxyethyl cellulose by bacteria and mold are not alleviated by such a method.

SUMMARY OF THE INVENTION

The instant invention eliminates the sodium of the sodium acetate impurity by means of cation ion exchange and thereby avoids the lumen loss in the completed lamp which would otherwise be caused by sodium reacting with the lamp phosphor. The method also prevents mold growth by the addition of ammonium hydroxide which reacts with the acetate ion remaining from the sodium acetate impurity, as the ammonium acetate formed by this reaction is the mold growth inhibitor. Preferably the pH of the solution is raised to about 8.5–9.0 by the addition of a basic solution, as it has been discovered that maintaining the solution in this pH range inhibits bacteria growth.

BRIEF DESCRIPTION OF THE DRAWINGS

For a better understanding of the invention, reference may be had to the accompanying drawings in which.

DESCRIPTION OF THE PREFERRED EMBODIMENTS

Figure 1:
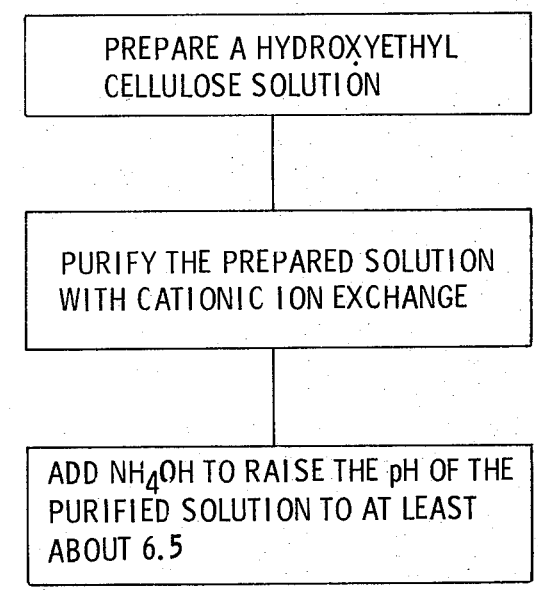
FIG. 1 is a flow chart illustrating the steps in the method used to prepare the vehicle using a cation ion exchange followed by an ammonium hydroxide addition.

With reference to FIG. 1 there is shown a flow chart of the instant method. An aqueous solution containing from aobut 0.06% to about 5% by weight of hydroxyethyl cellulose is prepared, using hydroxyethel cellulose which contains sodium acetate as an impurity (and all commercially available hydroxyethyl cellulose does contain sodium acetate impurities). The purified hydroxyethyl cellulose solution is then passed through an ion exchange means, which ion exchange consists essentially of a cation resin (but not an anion resin), and thus substantially removing the sodium ions of the sodium acetate impurity but leaving the acetate ions. Ammonium hydroxide is then added to raise the pH of the solution to about 6.5 and, by reaction with the acetate ions which remain, to form ammonium acetate, which ammonium acetate has been found to inhibit mold growth in the hydroxyethyl cellulose solution. After the suspension vehicle has been prepared, the particles to be coated can be added to the vehicle along with any desired wetting agents, defoaming agents, plasticizers, and adhesion promoting materials which are desired. This coating composition can then be used to coat discharge lamp envelopes which are then dried and lehred in the normal manner.

It will be noted that the sodium impurity which is known to be deleterious to lamp operation has been removed by the ion exchange and that the hydroxyethyl cellulose solution having been treated by the method of the instant process can be prepared in relatively large production batches and stored without incurring mold growth problems. Any coating composition prepared using a hydroxyethyl cellulose suspension vehicle prepared by the instant process can also be stored without incurring significant mold growth problems.

Figure 2:
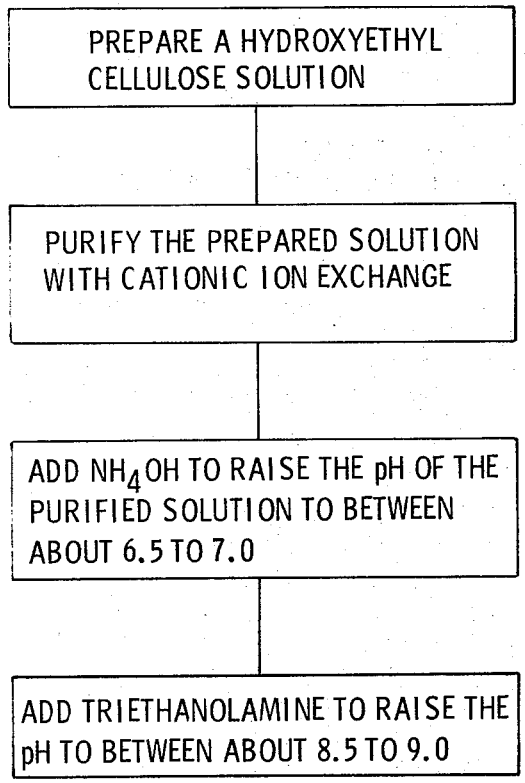
FIG. 2 is a flow chart illustrating the steps of the preferred method in which the purified solution is essentially neutralized by ammonium hydroxide and the neutralized solution is then raised to a high pH to inhibit bacterial growth.

Although the above process inhibits mold growth and thereby avoids the uneven flow and resulting poor texture including coating which mold cause, bacterial attack on the hydroxyethyl cellulose molecule can still, in time, lower the viscosity and the suspending ability of the hydroxyethyl cellulose solution. FIG. 2 illustrates a process in which the bacteria growth is also inhibited. The hydroxyethyl cellulose solution is prepared and purified by the cation exchange in the manner previously described. The hydroxyethyl cellulose solution leaving the cation exchange bed is substantially free of sodium, but contains acetic acid and its pH is typically about 3.0–3.2. Ammonium hydroxide is added to raise the pH of the purified solution to about 6.5–7.0. About 1.2% of $NH_3$ based upon the weight of the hydroxyethyl cellulose is required to neutralize the solution. A basic solution which lehrs off without leaving significant inorganic residue is then added to raise the pH of the solution to about 8.5–9.0. Preferably the basic solution is triethanolamine (is illustrated in that FIG. 2), but other basic solutions which lehr off without leaving significant inorganic residue (such as by adding more ammonium hydroxide), can be used. The basic solution can be added either during the preparation of the suspension vehicle (as when the suspension vehicle is to be stored for some time before the coating composition is to be prepared), or can be added when the other ingredients of the coating composition are added (as when the coating composition is prepared soon after the preparation of the suspension vehicle and the coating composition is to be stored, or the coating composition is made in a large batch which is used over several days production).

The following is an example of the preparation of a hydroxyethyl cellulose solution:

To 400 gallons of deionized water are added, with agitation, 60 kilograms of hydroxyethyl cellulose (commercially available as Cellosize QP–3). Agitation is continued for about two hours or until the hydroxyethyl cellulose is essentially all in solution. This solution is then pumped through a 75 micron filter to remove any undissolved particles and is then run through the cation exchange resin bed. The effluent from the cation exchanger is collected in a tank. Sufficient ammonium hydroxide solution is then added to raise the pH to about 6.5–7.0. This requires about 2500 cubic centimeters of reagent grade ammonium hydroxide (20% $NH_3$). The Cellosize QP–3 is a commercial grade of hydroxyethyl cellulose manufactured by Union Carbide Corporation which is of a quick dissolving type and produces a viscosity of 220–350 centipoises at a concentration of 5%.

A coating composition can be prepared using a portion of the above hydroxyethyl cellulose solution by, mixing the following ingredients in, for example, a round bottom 250-gallon stainless steel tank equipped with a one horsepower electric mixer by mixing the following ingredients for about two hours. The ingredients are: 20-gallons of deionized water, 120-gallons of hydroxyethyl cellulose solution prepared in the above manner, 10-gallons of slurry of 2.3 kilograms of aluminum oxide in deionized water, 2-gallons of triethanolamine, 600 cubic centimeters of defoamer, 800 cubic centimeters of wetting agent, and 455 kilograms of calcium halophosphate phosphor. This coating composition can be used to coat fluorescent lamp bulbs, for example, in the usual manner.

The result is a lamp of high efficiency, as the sodium (which, if not removed, would remain in the lamp coating after the normal lehring at 600° C.) has been eliminated by the cation ion exchange. The formation of a mold which could cause poor texture coating in the lamp has been inhibited by the ammonium acetate formed by reaction with the acetate ion impurity. The bacteria which could destroy the suspending ability of the vehicle has been inhibited by the high pH. Thus a vehicle which permits fabrication of efficient lamps and which permits storage either of the suspension vehicle or of the coating composition is achieved.

We claim:

1. The method of preparing a suspension vehicle for use in coating discharge lamp envelopes, using hydroxyethyl cellulose which contains sodium acetate as an impurity, said method comprising:
    (a) preparing an aqueous solution containing from about 0.06% to about 5% by weight of hydroxyethyl cellulose;
    (b) purifying the hydroxyethyl cellulose solution by an ion exchange means, said ion exchange means consisting essentially of a cation resin whereby the sodium ions of the sodium acetate impurity are substantially removed, but the acetate ions are not removed; and
    (c) adding ammonium hydroxide to raise the pH of the purified solution to at least about 6.5 and to form ammonium acetate to inhibit mold growth.

2. The method of claim 1, wherein ammonium hydroxide is added to raise the pH of the purified solution to between about 6.5 to 7.0 and a basic solution which lehrs off without leaving significant inorganic residue is added to raise the pH of the solution to about 8.5–9.0, whereby bacteria growth is inhibited.

3. The method of claim 2, wherein said basic solution is a triethanolamine solution.

References Cited

UNITED STATES PATENTS 3,557,082   1/1971   Bridgeford _____ 260—218

THEODORE MORRIS, Primary Examiner

U.S. Cl. X.R.

106—186, 194, 197 R